United States Patent
Jain et al.

(10) Patent No.: US 6,856,714 B1
(45) Date of Patent: Feb. 15, 2005

(54) FIBER OPTIC POINT TEMPERATURE SENSOR

(75) Inventors: Subhash Chander Jain, Chandigarh (IN); Nahar Singh, Chandigarh (IN); Gopal Chandra Poddar, Chandigarh (IN); Rajneesh Talwar, Chandigarh (IN); Ashu Kumar Bansal, Chandigarh (IN); Ram Prakash Bajpal, Chandigarh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/810,731

(22) Filed: Mar. 25, 2004

Related U.S. Application Data

(63) Continuation of application No. PCT/IB03/06207, filed on Dec. 26, 2003.

(51) Int. Cl.[7] ............ G02B 6/26; G01N 21/85; G01N 21/51

(52) U.S. Cl. ............ 385/12; 250/227.25; 250/574; 250/577

(58) Field of Search ............ 385/12, 15; 356/436, 356/441, 442; 250/216, 573, 574, 576, 577, 227.11, 227.14, 227.24, 227.25

(56) References Cited

U.S. PATENT DOCUMENTS 6,437,345 B1 * 8/2002 Bruno-Raimondi et al. ..... 250/458.1

* cited by examiner

Primary Examiner—John D. Lee
(74) Attorney, Agent, or Firm—Drinker Biddle & Reath LLP

(57) ABSTRACT

A fiber optic sensor for monitoring point temperature of in situ reactions in remote, based on the principle of guiding light by means of total internal reflection (TIR) occurring in a right-angled prism, mounted on a glass capillary tube comprises isopropyl alcohol in it and rises due to increase in temperature and touches the prism surface thereby preventing the occurrence of TIR thus reducing the level of output optical signal detected.

15 Claims, 1 Drawing Sheet

Figure 1:
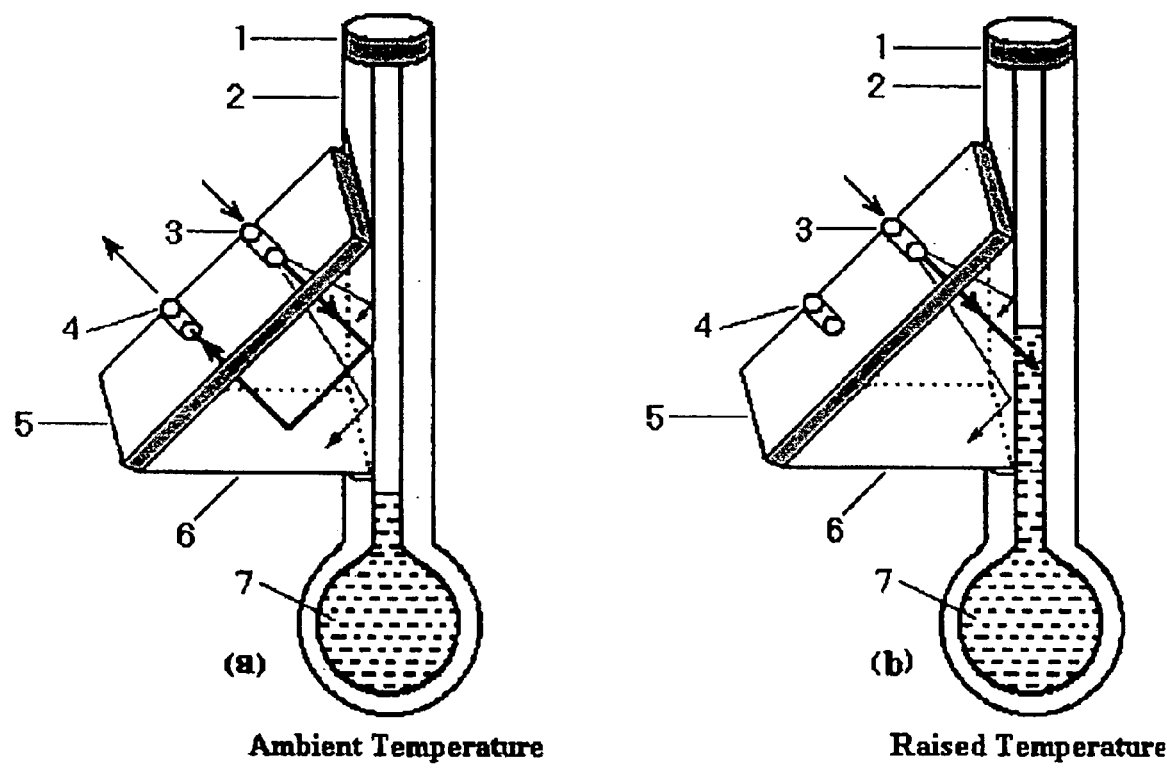

(a) Ambient Temperature (b) Raised Temperature (a) Ambient Temperature
(b) Raised Temperature

FIBER OPTIC POINT TEMPERATURE SENSOR

This application is a continuation of PCT/IB03/06207 filed Dec. 26, 2003.

FIELD OF INVENTION

The present invention relates to an optical sensor for monitoring point temperature of in situ reactions at remote places or at places that are corrosive and electro-magnetically noisy. More particularly, the present device is useful in petrochemical industry, process control industry, electrical and oil and gas exploration & mining industry.

BACKGROUND AND PRIOR ART

Petrochemical industry, process control industry, electrical, oil and gas exploration & mining industries are employed with various reactions in situ and in reactors whereas exact measurement of particular temperature has to be controlled for getting the desired products or composition, so all of these industries are concerned about possible methods and devices which are useful in monitoring the exact status of temperature in situ reactions at remote. Thus, it requires a real time automatic temperature monitoring technology in the industries and power plant environment. Temperature measuring devices such as thermistors, thermocouples and bi-metal type devices are undesirable for use in various industries because such devices are vulnerable to electromagnetic interference, heavy and may cause sparking.

Conventional temperature measuring devices has drawbacks of manual control, large in size and fragile and possesses inadequate dynamic range, lack measurement stability and have an unacceptably short lifetime and require complex calibration procedures when the devices are replaced. Such calibration procedures require a significant amount of time involvement.

In recent years fiber optic sensors have opened up applications for the sensing of many physical parameters because they possess a variety of advantages over the conventional. The advantages include a dielectric construction that permits usage in high voltage, electrically noisy, high temperature, corrosive or other hostile environments; geometric versatility that allows arbitrary configurations and inherent compatibility with fiber optic data links. These characteristics make fiber optic sensors an attractive way to monitor the status of temperature in various critical reactions in various industries.

It is therefore desirable to overcome above-mentioned problems in conventional sensors and employing optical sensors for monitoring the point temperature in situ reactions at remote places with high accuracy and in efficient way.

OBJECTIVE OF INVENTION

The objective of the present invention is to provide a reliable, durable, cost-effective an optical sensor for monitoring point temperature in situ reactions at remote places.

SUMMARY OF THE INVENTION

A fiber optic sensor for monitoring point temperature has been developed and investigated on the principle of guiding light by means of total internal reflection (TIR) occurring in a right-angled prism mounted on a glass capillary tube.

DETAIL DESCRIPTION OF INVENTION

The present invention relates to an optical sensor for monitoring point temperature of in situ reactions at remote places, said sensor comprising:

a glass capillary tube having a top end closed with a cap and a bulb at a bottom end for holding a liquid having good thermal expansion properties, said capillary tube having an outer and an inner vertical surface, wherein the outer vertical surface is provided with a groove and a hole is provided within the height of the groove;

a right angled prism formed by a hypotenuse, a base reflective surface and an upright reflective surface being placed in the groove formed so as to locate the reflective surface of the prism close and parallel to the inner surface of the capillary tube, a fiber holding plate covering a hypotenuse surface of the right angle prism and provided with two holes for holding fibers, one of which is connected to a light source and one being connected to a photo detector, the fibers connected to the light source and the photo detector are located on the holding plate such that under normal conditions, the light emitted by the light source undergoes total internal reflection (TIR) at the two reflecting surfaces of the prism and is coupled back to the fiber connected to the photo detector and at the desired point temperature, the light emitted by the light source does not undergo TIR and passes through the upright reflecting surface.

In an embodiment of the present invention, the liquid used is transparent to light. In another embodiment of the present invention, the liquid used is Isopropyl alcohol.

In yet another embodiment of the present invention, the base reflective surface of the right angled prism is located below the upright reflective surface.

In still another embodiment of the present invention, wherein the optical fiber, the right angle prism and the glass capillary are made of dielectric material which is non-conductive, non-inductive, non-corrosive and immune to electromagnetic interference (EMI)/Radio Frequency interference (RFI) effects.

In one more embodiment of the present invention, wherein the locations of a lower end and an upper end of the groove are determined by the height of the liquid inside the capillary tube at room temperature and the boiling temperature of the liquid.

In one another embodiment of the present invention, the location of the hole inside the groove is determined by the thermal expansion of liquid and the point temperature to be monitored.

In a further embodiment of the present invention, the optical fibers used are single mode or multi mode fibers.

In a further more embodiment of the present invention, wherein the optical fibers used are multimode fibers.

In an embodiment of the present invention, wherein the photo detector used is a Si-PIN photo detector with an optical power meter.

In another embodiment of the present invention, the fiber holding plate is made of aluminum.

In yet another embodiment of the present invention, the fiber holding plate has two holes for holding the optical fibers.

In still another embodiment of the present invention, said device is used to measure a point temperature in the range of 30 to 80° C. and the device work as an optical ON/OFF switch for the point temperature.

In one more embodiment of the present invention, the said optical sensor device has accuracy of about ±1° C. to monitor the predetermined temperature/set point temperature.

Any liquid, which does not chemically react with glass, can be used for measuring temperature in present device provided the boiling point of liquid it lies within the specified temperature range for which the device is intended. The useful range of the device is determined by initial level of isopropyl alcohol taken in the capillary. As is evident, for a large range, the initial level of isopropyl alcohol at the room temperature should be taken at a lower value and for a smaller range of temperature; a higher level of isopropyl alcohol should be taken. The temperature range realizable/achievable is specifically determined by the rise in the level of isopropyl alcohol due to thermal expansion up to the position of the hole. The lower temperature limit corresponds to lower level of isopropyl alcohol and the higher temperature limit corresponds to the height of the hole up to which isopropyl alcohol finally rises and at which stage the optical signal suddenly falls off due to prevention of the process of TIR in the prism. The isopropyl alcohol was taken in the capillary up to a certain level at room temperature and then its corresponding rise in the capillary for increase in temperature with the bulb of capillary (containing isopropyl alcohol) dipped in a heating water bath, was recorded between 30–80° C. and it was observed to be quite linear. For every 10° C. rise in the temperature, the level of isopropyl alcohol rose on an average by 5 mm typically. The hole was located at the mid point between 70°–80° range e.g. for 75° C. This temperature value of 75° C. corresponds to the monitoring temperature of electrical transformers and it is an important and useful application for this device.

For making a groove to position the prism properly on the capillary, the semi-circular wall of the capillary was grounded and smoothened over an appropriate length for accommodating the prism surface to be fixed on the flattened portion of the capillary by making a good contact. The higher wall thickness of the capillary is not required because the prism side other than hypotenuse on which light is in incident first has to rest on the flattened portion within the groove cut on the capillary and the other two walls/sides of the prism should be clear from making any contact with other surfaces such as of thick capillary wall suggested, otherwise, such an arrangement will hinder placement of fibers (on the hypotenuse surface) and interfere with the TIR process taking place on the second surface. Thus, there is no need of extra capillary walls because they are required to be kept vertical and they will not touch the two prism surfaces which are both slanting. The other possible shape/configuration of capillary will not allow the TIR process to happen efficiently. The prism is quite small in size & light in weight and it is conveniently mounted in the capillary groove quite ruggedly using UV curable epoxy.

The present device is not required to be replaced for a new or different point temperature value to be sensed but the initial level of isopropyl alcohol (the sensing liquid) is needed to be appropriately reset after removing the cap of the capillary in accordance with the point temperature to be measured/monitored. The capillary bulb containing isopropyl alcohol can be dipped in any liquid whose point temperature is to be monitored in a given process. The sensing liquid is inside the capillary and is not changed. However, if the sensing liquid is to be changed, then with different sensing liquids, the device parameters will also be changed e.g. even if the initial level of the various liquids in the capillary is kept same, then based on their thermal expansion property, a given hole height shall be reached by the different liquids at different temperatures and so this device in the present configuration shall work for different point temperatures when different sensing liquids are being used.

There is no electrical signal being guided and it is only the light signal which is transmitted through a glass prism and optical fibers and is unaffected by the presence of electrical signals.

A comparison between the present sensor and the conventional methods for monitoring temperature of liquids is given below:

| Sr No | Comparison Chart | |
|---|---|---|
| | Conventional Technique | Present Technique |
| 1 | Manual | Automatic |
| 2 | No remote monitoring | Remote monitoring |
| 3 | Large size and fragile | Compact and rugged |

In an embodiment of the present invention a suitable fiber optic sensor based on TIR has been identified, developed and implemented for the particular application of monitoring point temperature in a process. The technique can be easily automated for in-situ and remote monitoring of temperature.

In another embodiment of the present invention, a total internal reflecting prism mounted on a glass capillary tube (containing isopropyl alcohol) and optical fibers have been employed which are highly durable material being non-conductive and non-inductive in nature. The sensing signal is in the form of intensity-modulated light guided by the prism and the detector fiber. The signal propagation is secure without any cross talk or interference problems.

The fiber optic point temperature sensor based on total internal reflecting prism comprises of coupling light from a quartz halogen lamp into a right-angled prism using an optical fiber and monitoring the modulation of the total internally reflected light signal as it transverses the prism by a liquid (isopropyl alcohol) which rises in the glass capillary and touches the prism surface. Total internal reflection taking place at the prism surface depends on the refractive index of the surrounding medium. As the air outside the prism surface is replaced by the rising liquid (isopropyl alcohol), the condition of TIR is not satisfied and light leaks out from the prism through its surface leading to a drop in the detected optical signal. The total internal reflected signal is collected by another fiber, which guides it to a Si photo-detector. Due to heat, the isopropyl alcohol rises in the capillary and leaks out through the hole provided on the capillary to the prism surface thus resulting in the drop of optical signal at the corresponding temperature.

The fiber optic sensor facilitates monitoring of point temperature of liquids employing the principle of TIR of light occurring in a right-angled prism. This process of TIR basically involves intensity modulation of the light signal and is unaffected by a hostile, hazardous, corrosive and electrically noisy environments encountered in petrochemical and other industries. This is so because optical fibers, prism and capillary tube are made from dielectric materials and therefore, they are both non-inductive and non-conductive in nature thereby making the sensor immune to electromagnetic interference (EMI) and radio frequency interference (RFI). Also the basic raw material—optical glass from which fibers and other items are made is quite durable and it effectively withstands harsh and corrosive environments encountered in various application areas.

This sensor has been realized in the Laboratory for a particular temperature point (75° C.) using a 1.0 mm bore capillary tube with a wall thickness of 3.35 mm, the isopropyl alcohol and a prism mounted on a small hole of typically 1.0 mm diameter drilled in the capillary at a specific location determined by the temperature range of interest to be covered by the sensor. For the lab model described above, the initial level of isopropyl alcohol taken in the capillary has been kept at 60 mm and the hole has been drilled at a height of 84.5 mm for realizing the range of 30–80° C. The upper limit of temperature range has been fixed at 80° C. as the boiling point of isopropyl alcohol is about 82.3° C. The particular value of temperature for which this sensor can work as a switch depends on the initial level of isopropyl alcohol selected in the capillary at room temperature. There is instantaneous change in the total internal reflected optical power as soon as the isopropyl alcohol rises in the capillary due to increase in temperature and touches the prism surface thus preventing TIR process to happen and resulting in drop of the optical signal detected. The design of the sensor is such that it can be realized for any value of temperature in the specified range and can work as an optical on/off switch for that particular value. The sensor is able to monitor the pre-determined/set point temperature within ±0.01° C. and has exhibited a good and repeatable performance.

This sensor could be beneficially used for monitoring temperature of liquids for various scientific, industrial and medical applications. An alarm can be sounded as soon as a specified level of the isopropyl alcohol has attained or the process is shut by an actuator. The temperature monitoring can be carried out remotely by extending the length of optical fibers. It can be quite a durable and cost-effective device and the process monitoring operation can be made automatic.

BRIEF DESCRIPTION OF ACCOMPANYING FIGURE

FIGS. 1(a) and 1(b) represent the schematic of the fiber optic sensor developed for monitoring point temperature of liquids in various industrial applications.

As can be seen from FIG. 1, the device of the present invention comprises of a small size (10 mm×10 mm×14 mm) total internal reflecting prism with a thickness of 7 mm, two multimode fibers—one for the white light source and other for the photodetector, a glass capillary tube and isopropyl alcohol contained in the capillary tube. The various parts of the configuration have been labeled as under:

1 Cap
2 Glass capillary
3 Source fiber
4. Detector fiber
5 Fiber holding aluminum plate
6 Total internal reflecting prism
7 Isopropyl alcohol Accordingly, the present invention provides a fiber optic sensor for monitoring point temperature of liquids. The sensor involves coupling of light from a 50 W quartz halogen lamp into a source fiber, which makes it incident onto the hypotenuse surface of the total internal reflecting prism. The hypotenuse surface of the prism is covered with an aluminum plate for the purpose of holding two optical fiber guides—one linked to the light source and the other to the photo detector. This light undergoes TIR at the other two prism surfaces and is coupled back to the photo detector fiber and finally guided to a Si PIN photo detector and an optical powermeter. The prism is mounted in an appropriate groove cut on a glass capillary using suitable epoxies with its first surface e.g. one facing the incident light first among the two reflecting surfaces, positioned on a small hole drilled in the capillary. Special care was exercised while fixing the prism on the hole so that the epoxy used does not block the hole itself. The capillary (length: 112.0 mm) has a glass bulb (inner dia: 14.50 mm) at its bottom containing isopropyl alcohol, which has a good thermal expansion property. With the increase of temperature, isopropyl alcohol undergoes thermal expansion and rises in the capillary. The liquid comes out through the hole located on the capillary and causes the light to leak out from the prism, because with the increase of refractive index of the medium outside the prism surface due to replacement of air (refractive index=1.0) by the isopropyl alcohol (refractive index=1.375), TIR does not take place and light thus leaks out from this surface into the isopropyl alcohol resulting in a sudden drop of optical signal at the photodetector. A novel design feature of this temperature sensor is that for the given capillary bore size of 1.0 mm and the location for fixing the prism, it can be realized for any value of temperature between 30–80° C. range by choosing the initial reference level of the isopropyl alcohol in the capillary, which is quite a convenient and easy process. For the purpose of experimentation and investigations, a temperature switch for 75° C. was realized in the Laboratory keeping in view the specific application of monitoring the heating of electrical transformers and the device has exhibited a satisfactory and repeatable performance.

Advantage of the Present Invention:

1. It can work for process industry applications where the environment is hostile, harsh and electrically noisy.
2. It can monitor remotely point temperature of liquids and solvents in industrial applications and the process can be made automatic.
3. A simple, low cost, compact, light weight, portable, rugged and durable device.

What is claimed:

1. An optical sensor for monitoring point temperature in remote and in situ reactions, said sensor comprising:

a glass capillary tube having a top end closed with a cap and a bulb at a bottom end for holding a liquid having good thermal expansion properties, said capillary tube having an outer and an inner vertical surface, wherein the outer vertical surface is provided with a groove and a hole is provided within the height of the groove;

a right angled prism formed by a hypotenuse, a base reflective surface and an upright reflective surface being placed in the groove formed so as to locate the reflective surface of the prism close and parallel to the inner surface of the capillary tube, a fiber holding plate covering a hypotenuse surface of the right angle prism and provided with two holes for holding fibers, one of which is connected to a light source and one being connected to a photo detector, the fibers connected to the light source and the photo detector are located on the holding plate such that under normal conditions, the light emitted by the light source undergoes total internal reflection (TIR) at the two reflecting surfaces of the prism and is coupled back to the fiber connected to the photo detector and at the desired point temperature, the light emitted by the light source does not undergo TIR and passes through the upright reflecting surface.

2. An optical sensor device as claimed in claim 1, wherein the liquid used is transparent to light.

3. An optical sensor device as claimed in claim 1, wherein the liquid used is Isopropyl alcohol.

4. An optical sensor device as claimed in claim 1, wherein the base reflective surface of the right angled prism is located below the upright reflective surface.

5. An optical sensor device as claimed in claim 1, wherein the optical fibers, the right angle prism and the glass capillary tube are made of dielectric material which is non-conductive, non-inductive, non-corrosive and immune to electromagnetic interference (EMI)/Radio Frequency interference (RFI) effects.

6. An optical sensor device as claimed in claim 1, wherein the locations of a lower end and an upper end of the groove are determined by the height of the liquid inside the capillary tube at room temperature and the boiling temperature of the liquid.

7. An optical sensor device as claimed in claim 1, wherein the location of the hole inside the groove is determined by the thermal expansion of liquid and the point temperature to be monitored.

8. An optical sensor device as claimed in claim 1, wherein the optical fibers used are single mode or multi mode fibers.

9. An optical sensor device as claimed in claim 1, wherein the optical fibers used are multimode fibers.

10. An optical sensor device as claimed in claim 1, wherein the photo detector used is a Si-PIN photo detector with an optical power meter.

11. An optical sensor device as claimed in claim 1, wherein the fiber holding plate is made of aluminum.

12. An optical sensor device as claimed in claim 1, wherein the fiber holding plate has two holes for holding the optical fibers.

13. An optical sensor device as claimed in claim 1, wherein said device works as an optical on/off switch for a specified temperature.

14. An optical sensor device as claimed in claim 1, wherein said device is used to measure a point temperature in the range of 30 to 80° C.

15. An optical sensor device as claimed in claim 1, wherein the said optical sensor device has accuracy of about ±1° C. to monitor the predetermined temperature/set point temperature.

* * * * *